United States Patent
Garg

(10) Patent No.: US 9,544,195 B1
(45) Date of Patent: Jan. 10, 2017

(54) BANDWIDTH MONITORING FOR DATA PLANS

(75) Inventor: Parag K. Garg, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/308,297

(22) Filed: Nov. 30, 2011

(51) Int. Cl.
*H04L 12/24* (2006.01)
*H04L 12/863* (2013.01)

(52) U.S. Cl.
CPC ......... *H04L 41/0896* (2013.01); *H04L 47/627* (2013.01)

(58) Field of Classification Search
CPC ..... H04L 47/00; H04L 47/327; H04L 41/0896
USPC .................. 370/253; 709/223, 225
See application file for complete search history.

(56) References Cited

U.S. PATENT DOCUMENTS

| | | | |
|---|---|---|---|
| 2003/0169460 A1* | 9/2003 | Liao et al. | 358/426.08 |
| 2007/0133603 A1* | 6/2007 | Weaver | H04L 43/0882 370/468 |
| 2011/0012993 A1* | 1/2011 | Kuno | G09G 3/003 348/43 |
| 2011/0019156 A1* | 1/2011 | Chang | H04N 9/3173 353/31 |
| 2011/0116444 A1* | 5/2011 | Relyea | 370/328 |
| 2012/0033606 A1* | 2/2012 | Chun et al. | 370/315 |
| 2012/0117478 A1* | 5/2012 | Vadde | G06F 9/54 715/736 |
| 2013/0122854 A1* | 5/2013 | Agarwal | H04L 12/141 455/405 |

* cited by examiner

*Primary Examiner* — Andrew Lai
*Assistant Examiner* — Sumitra Ganguly
(74) *Attorney, Agent, or Firm* — Polsinelli LLP

(57) ABSTRACT

Users with limited data plans for a network connection can have usage of that network connection by various applications monitored such that the user can determine how much bandwidth each application uses based on activity of that user. Upon viewing application-specific usage information and/or determining how much each application can contribute to overage charges, the user can determine how to adjust behavior to meet personal usage targets. In at least some embodiments, a user can specify limits for specific applications, after which the traffic for that application can be blocked or at least require approval from the user. Such limits also can guarantee enough bandwidth for specific applications when the user otherwise would reach or exceed the maximum amount of bandwidth under the data plan.

15 Claims, 7 Drawing Sheets

BANDWIDTH MONITORING FOR DATA PLANS

BACKGROUND

As an increasing variety and amount of content is being made available over networks such as the Internet, users are obtaining an increasing amount of their content over those networks. Users can access this content using any appropriate electronic device, including devices that utilize cellular-based networks or similar wireless connections to obtain the data. In many cases, providers of these network connections include a certain amount of data transmission or bandwidth with a monthly data plan, and any data transmission exceeding that amount can result in substantial additional charges. Users typically have no way of knowing how much data is required for various tasks, which prevents users from managing their use of data to either avoid overage charges or have the ability to approve transmissions that will result in overage charges before the transmission occurs.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing bandwidth and data plan usage in an electronic environment. In particular, various approaches provide the monitoring of bandwidth usage for various applications or other sources of data transmission, such that a user can be provided with information about that usage. A user able to view information about the amount of bandwidth needed for various applications or tasks can then adjust usage behavior accordingly.

In at least some embodiments, users, providers, or other authorized users can set limits or other thresholds or usage criteria for specific applications or types of transmission. For example, a user might consider a certain application to be relatively important such that the user wants to guarantee a minimum amount of bandwidth per billing or usage cycle. The user also might want to ensure other applications never use more than a certain amount of bandwidth per cycle. The user can specify various actions to be taken for certain applications when those applications are approaching, at, or exceeding the specified limits. For example, a user might allow high priority applications to exceed the limits, but want to be notified of the overage. For medium priority applications, the user might want to be prompted to approve the overage before a transmission will be allowed. For lower priority applications, the user might want to block that application from transmitting data when that application reaches a certain bandwidth limit. Similar actions can be taken when the user is roaming or otherwise connected to a network for which additional fees apply. Various other actions and limits can be utilizes as well as discussed herein.

Various aspects of the monitoring and managing can be implemented on a client device or on a remote system or server. For example, a client device can include logic to monitor requests before those requests arrive at a network communication component, and can approve or deny the transmission based on various criteria. In other embodiments, all transmissions might go to a remote system or server, such as a network service provider, whereby the provider can determine whether to allow the transmission, and in some cases can have the ability to modify one or more aspects of the transmission.

Various other functions and advantages are described and suggested below as may be provided in accordance with the various embodiments.

Figure 1:
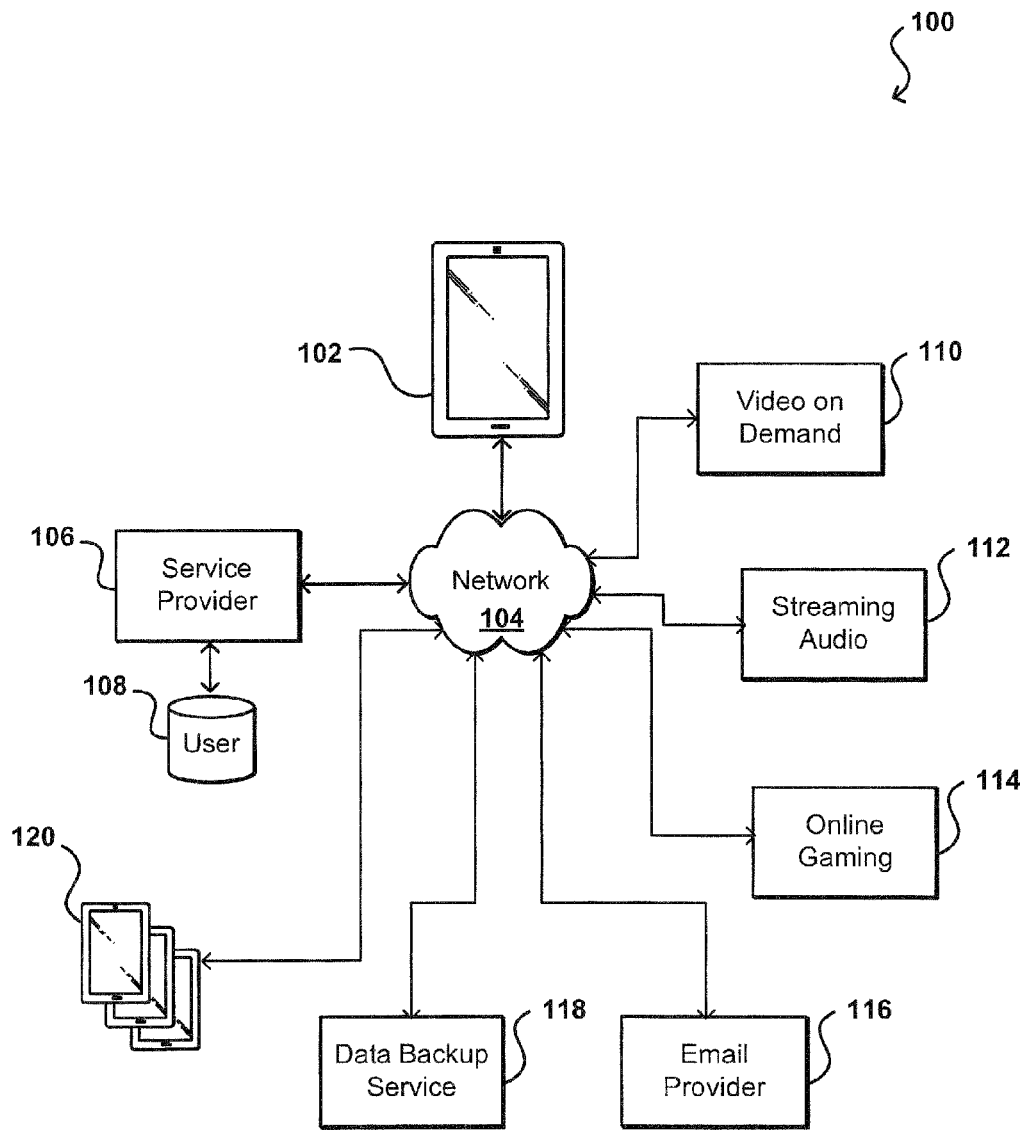
FIG. 1 illustrates an example environment in which various embodiments can be implemented.

FIG. 1 illustrates an example environment 100 in which aspects of various embodiments can be implemented. In this example, a user can utilize a computing device 102 to access content from multiple places and providers across one or more networks 104. These networks can include, for example, the Internet, and Ethernet, a cellular network, a wireless data network, a local area network (LAN), a peer-to-peer network, and the like. The user can utilize the network to access various types of content from various different sources, such as streaming video from a video-on-demand provider 110, music from a streaming audio provider 112, and online gaming content from an online gaming provider 114. The user can also utilize the network to access and send email or other such messages using an email provider 116 or other such entity, and can cause data and other information to be backed up to at least one remote data backup service 118. The user also can utilize the network to contact other personal computing devices 120, such as to send text messages or instant messages.

For at least some of these networks, the user might have to subscribe to a data plan with at least one network service provider 106 to obtain network access. Conventional service providers can include, for example, an Internet service provider (ISP) or a cellular network provider. In many cases, a user subscribing to a wired network connection offered by an ISP might receive unlimited data bandwidth per month, or another such period or amount. A user subscribing to a cellular data plan, on the other hand, might receive only a limited amount of bandwidth with a subscription. When accessing various types of content from multiple sources as illustrated, the user can quickly utilize a significant amount of bandwidth, particularly for content such as streaming music, video on demand, and application download. The service provider system 106 can monitor the usage of the network by the client device (and potentially any other devices associated with the same user or user account) and store usage information in at least one user data store 108, which can also include information such as the amount of bandwidth per unit time that the user has as part of the subscription. At the end of the month or another appropriate cycle, the service provider can determine the total amount of bandwidth used by the user in the previous cycle, can compare that amount against the allocated amount as part of the subscription, and can determine any amount of overage. The service provider then can determine the amount the user owes for the overage, and charge the user the determined overage amount.

As discussed, however, conventional approaches to overage billing do not enable the user to determine how much each application, service, or other source of data transmission contributed to the overage. For example, FIG. 2(*a*) illustrates an example electronic bill or usage summary that could be presented to the user through a billing interface 200 displayed on a client device. As illustrated, the user can view information 204 about the data subscription, such as the amount of bandwidth per month included with the subscription, as well as the actual amount of bandwidth used with that subscription in the previous month. The user can also view the amount that the user is being billed for the amount of bandwidth used in excess of the allocated amount. This type of information is typical of conventional bandwidth summaries, as it does not indicate to the user any detailed information about the bandwidth usage. In this example, however, the user can select an option 206 to enable the user to obtain a breakdown of that usage, or otherwise obtain information related to the usage.

Figure 2A:
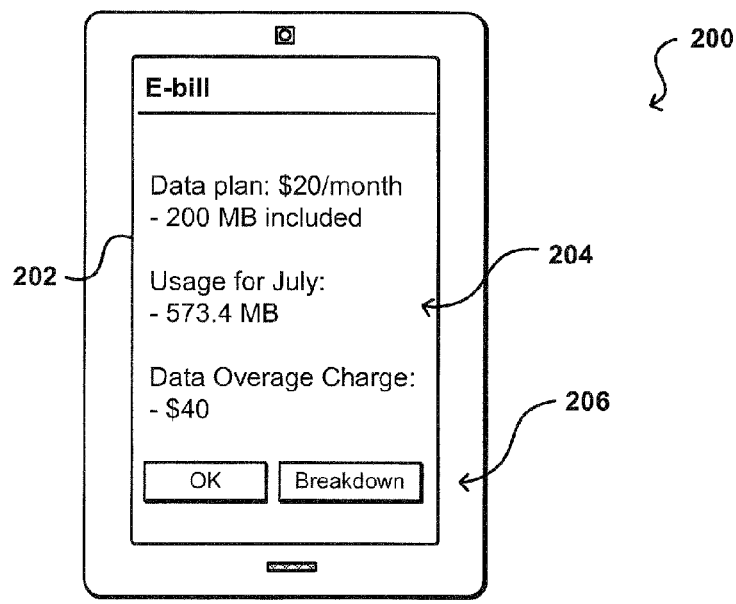
FIGS. 2(a) and 2(b) illustrate example interfaces that can be provided to a user in accordance with various embodiments.
Figure 2B:
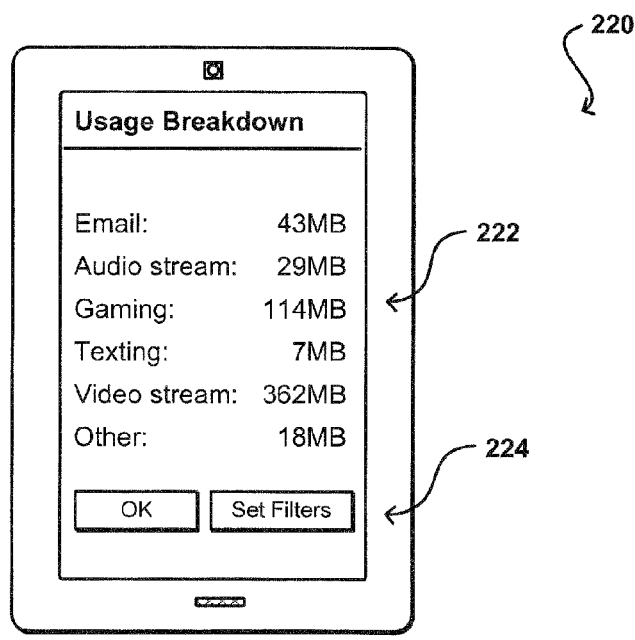

FIG. 2(*b*) illustrates an example interface display 220 that can be presented to the user in response to a request for more detailed information. In this example, the user is able to view information 222 relating to the amount of bandwidth usage for the previous period that was attributable to various sources of data transmission. For example, the user is able to view how much bandwidth was used for an email application, for audio streaming for one or more applications, gaming, texting, and video streaming. As should be understood, the breakdown can be provided by any appropriate selection and/or categorization, as may include specific applications, types of applications, forms of data transmission, etc.

Such a display can be beneficial to a user for a variety of reasons. For example, a user can determine which how much bandwidth each application generally requires per month, based on user activity levels. In this example, a user can see that the usage for video streaming alone is almost twice the monthly allocation. The user can also determine that certain applications that the user needs, such as email and texting, require well under the allocated amount, such that the user can make adjustments to less essential applications if the user wants to avoid overage charges. Similarly, if the user does not want to reduce the amount of monthly online gaming, the user can determine how much of the allocation can be dedicated to other applications, and can attempt to adjust usage of those applications accordingly.

Figure 3:
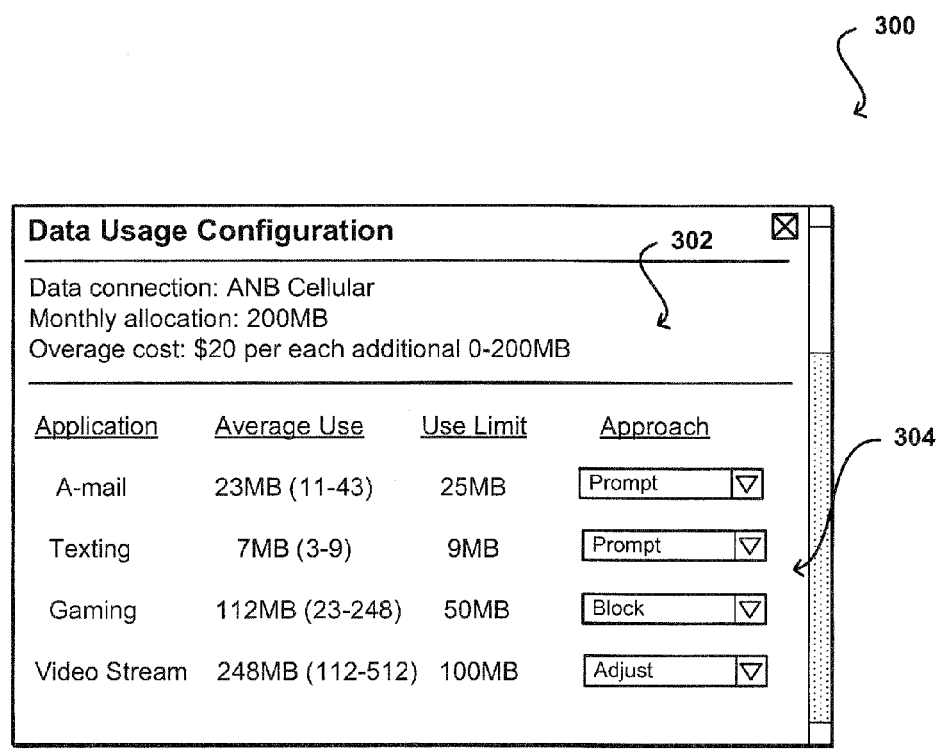
FIG. 3 illustrates an example interface that can enable a user to adjust bandwidth settings in accordance with various embodiments.

Approaches in accordance with various embodiments can also provide functionality to assist the user in adjusting usage of various applications or other sources of data transmission. For example, the interface display 220 of FIG. 2(*b*) includes an option 224 enabling the user to set one or more filters for the transmission of data using the respective provider network. An example of an interface 300 enabling a user to specify such filters is illustrated in FIG. 3. In this example, the user is able to view information 302 about the network subscription, such as the amount of bandwidth included with the subscription and the cost of any data overage. The user is also able to view information 304 for various sources of data transmission using the data network. In this example, the user is able to view the average monthly bandwidth usage for a number of different applications, as well as the range or standard deviation of usage for previous months. The user can also set use limits for each of these applications, as well as an action or approach to be taken when the user is at, near, or over the usage limit for a particular application.

For example, in this example the user has set a usage limit for a particular email application ("A-mail") to have a limit of 25 megabytes (25 MB) per billing cycle, which is just above the average usage amount for that application. The user has also indicated that the user would like to be notified if the user is going to go over the limit for that application in a given month. Using such an approach, the user can allow for a little more than the average usage before being notified, but since email might be relatively important to the user, the user has selected to be notified when the user is at or near the limit for that application. In this way, the user can continue to use the email application, but can be aware that the user might want to adjust usage of that application to prevent significant overage fees. In this example a similar approach has been selected for text messaging, which a user might use to communicate with friends, family, co-workers, or other persons, and thus should be available to the user in case of emergency, important messages, etc.

In this example, the user has been able to determine that the user is dedicating a significant amount of bandwidth to online gaming. The user might not have realized the amount of bandwidth required, or simply might want to cut back on the amount of gaming in order to reduce monthly overage charges. Accordingly, the user has set a usage limit for online gaming (whether from a specific site or source, or applications of that type in general, etc.) that is significantly less than the average usage for that type of application. The user has also indicated that bandwidth for online gaming should be blocked when the user reaches the set limit. The user might view online gaming as recreational, but is not willing to pay overage fees for that activity. Accordingly, the user can allow up to a set amount per month, but block usage after that point until the next cycle starts. Such an approach can also be useful for family plans or other such situations where one user might get a certain allocation for a given activity, such as gaming, but is not allowed to further limit bandwidth usage for others on the plan.

The user has similarly set a limit for video streaming that is less than the average amount for the application. Instead of blocking further usage, however, the user has specified that the application can adjust the transmission and/or type of data, such as to utilize a slower connection or a lower quality video stream, such as 2D instead of 3D video or standard definition instead of high definition, etc. The user might want to continue to be able to view video during a current cycle, but might want to utilize a lower quality stream when the user will have to pay extra for that content. Various other adjustments, filters, and settings can be made as well within the scope of the various embodiments.

Based at least in part upon the configurations or settings specified by the user (or another such entity), various types of notifications can be provided to the user when the user (or application or device, etc.) attempts to initiate a data transfer of a type that will result in the exceeding of a specified bandwidth limit. For example, FIG. 4(*a*) illustrates an example device display 400 that can be provided in response to a user requesting to start a video stream that is determined to cause the user to go over the monthly limit for video streaming if allowed. In this example, the notification provides information 402 indicating the type of overage that will be triggered and the cost to the user for the overage. The user then can provide input by selecting a option 404 to proceed with, or cancel, the stream request.

Figures 4A, 4B, 4C:
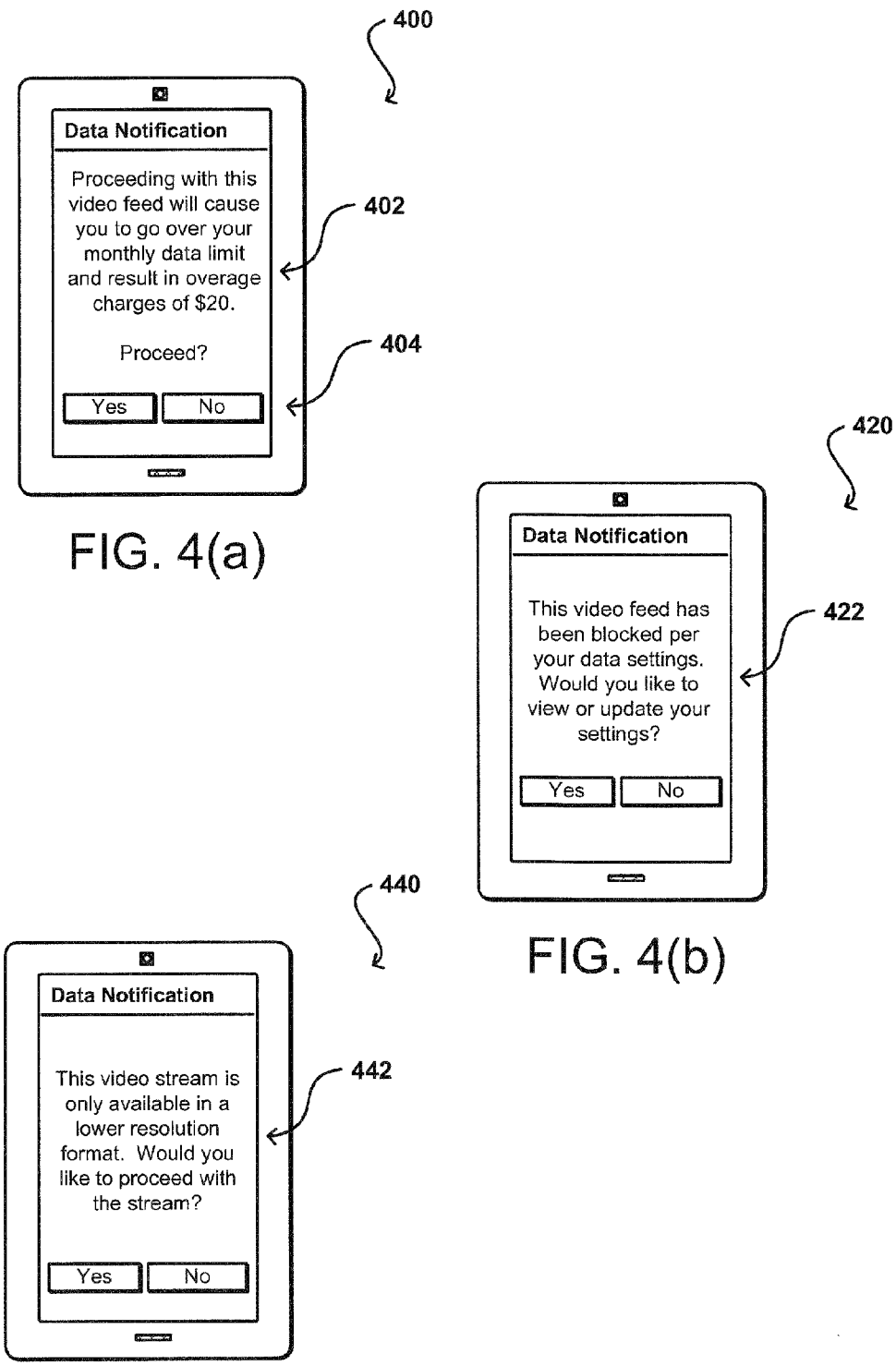
FIGS. 4(a), 4(b), and 4(c) illustrate example displays that can be provided to a user in accordance with various embodiments.

FIG. 4(*b*) illustrates another example device display 420 wherein the user has specified that transmissions of streaming data be blocked after the user reaches the specified limit for that type of data. The notification information 422 indicates that the user cannot obtain that stream because the type of feed has been blocked through the data settings. In this example, the user can select an option to update the settings if the user would like to enable the feed or otherwise change the way in which the particular type of content is managed.

FIG. 4(*c*) illustrates another example interface display 440 that can be presented when a user has selected to adjust the video feed when the transmission will cause the user to go over the specified limit. In this example, the device can first notify the user that the video stream will be presented in a lower quality format, such that the user can decide whether to proceed with the stream, particularly where the user has to pay for the video stream. Various other notifications can be provided as well as should be apparent.

Figure 5:
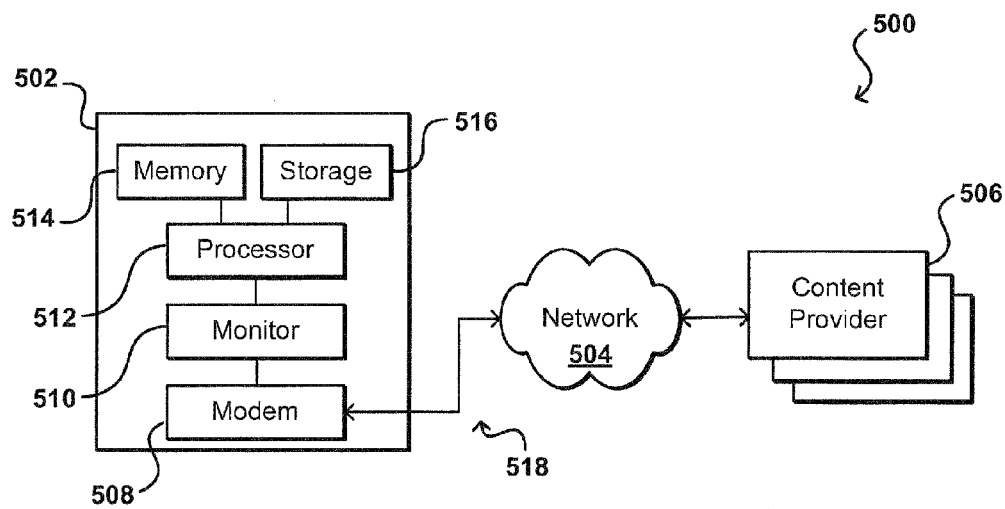
FIG. 5 illustrates a first example configuration that can be used to implement aspects in accordance with various embodiments.

FIG. 5 illustrates a first example configuration 500 that can be used to provide for content filtering and/or bandwidth management in accordance with various embodiments. In this example, the management is performed at least in part using a monitoring component 510, implemented in hardware and/or software, on the computing device 502 of the user. In this example, the monitoring component sits on a path (physical or logical) between a processor 512 of the device, which can be executing one or more applications attempting to transfer data over a network connection 518, and a modem 508 or other communication component operable to transmit data and/or a request for data over the network connection. In some embodiments there can be multiple possible network connections, such as a cellular network connection and a Wi-Fi connection, and one or more monitoring components can be used to monitor bandwidth on any connection where the amount of data used can be of interest to the user or another such party.

In this example, the processor can store information such as usage limits and current usage amounts in one or more storage devices 516, such as hard drives or flash drives in the device. In other embodiments, the computing device might cause at least some of this information to be stored remote to the device, such as by a remote data service or through the network provider. Instructions, limits, and/or other such information can be loaded in memory 514 on the device such that when an application executing on the computing device attempts to cause data to be transmitted across the network connection by the modem 508, the monitoring module 510 can first analyze the request to be transmitted in order to determine whether the request itself will exceed any specified limits, or if the data to be transmitted in response to the request (e.g., received from a content provider) will violate any such limit(s). The monitoring component can then perform an analysis to determine whether to enable the request to pass to the modem and out onto the network, based at least in part upon the current data settings.

In at least some embodiments the monitoring logic can be built into the network stack layer on the computing device 502, such that a request to be sent out on a particular network can be analyzed to determine information such as the size of the request, the destination of the request, and the application associated with the request. As an example, the monitoring logic might analyze a request before that request hits the modem (or other network interface device) and determine that the request originated from an application on the device that is associated with streaming audio (e.g., Pandora®, iHeartRadio®, or Slacker®). If the user has already exceeded the limit for streaming audio, the monitoring component can determine the action to be taken in such an instance, as may be configured by the user, and take an appropriate action. For example, the monitoring component can cause a message to be displayed to the user that the content is being blocked or requires confirmation, as discussed elsewhere herein. In some embodiments, the monitoring component could instead delete the request and cause an error to be displayed on the device. Various other options can be utilized as well as should be apparent in light of the present disclosure.

If, instead, the user is not yet at the limit but is approaching the limit, the monitoring logic can be configured to perform any of a number of actions. In some embodiments, the monitoring logic can allow the request to pass to the modem and out across the network 504 to an appropriate content provider 506. In other embodiments, the monitoring module might cause a notification to be displayed to the user indicating that the user is close to the limit, or prompting the user to confirm the stream even though the stream may cause the user to go over the limit. For example, a message can be provided indicating that the user will likely go over the limit and providing an estimated cost for the overage. In other embodiments, a message might indicate how long a user can likely continue streaming before hitting the set limit. In some embodiments, a timer or bandwidth monitor might be displayed when the user is nearing, at, or over the bandwidth limit (or at all times, if desired) enabling the user to determine how much time the user has left for a particular activity and/or how much additional cost the user is incurring through a particular activity.

In at least some embodiments, the monitoring component can provide an interface that the user can access to view information about network traffic across the respective network connection 518. For example, the user can view how much data has been utilized so far for each of a plurality of applications, data types, or actions. The user can also view as how much bandwidth is left before going over one or more set limits, how much overage has occurred, a likely projected usage based on current and/or historical rate, an estimate of overage charges, and/or other such information. Such an interface can include information such as that illustrated in FIG. 3 as well, as may enable the user to adjust settings for the current month, current settings for the account in general, or other such information. In some embodiments a user can shift allocations for the current billing cycle. For example, if a user is near the limit for one application but 20 MB below the limit for another application, the user can shift all or part of that 20 MB to enable the user to be able to continue to use one or both of those applications for the remainder of the billing cycle. In some embodiments, the monitoring module might prompt the user when the user is near a limit for one application but under the limit for another application, asking whether the user would like to adjust the limits for the current cycle. The monitoring component can also track this actual usage over time, and can recommend or in some instances automatically adjust the limits for various applications based at least in part upon actual usage rates.

In some embodiments, the monitoring module 510 can also select an appropriate connection speed for a particular request. For example, a network provider or carrier might offer pipes or connections with different transmission speeds. In some embodiments, a user might be able to use the fastest connection, socket, or "pipe" (included in the subscription or data plan) when the user is sufficiently under the monthly limit overall, or at least for any specific application. When the user approaches a limit for an application, or a portion of the limit as may be specified by the user, the monitoring module 510 can cause the request to be transmitted and/or response from the content provider (or other party) to be transmitted using a lower speed pipe or transmission rate. The change in transmission speed can be application- or data type-specific in at least some embodiments, as certain types of data might not work well with lower data speeds. For example, email or text messaging might be able to work relatively well using a lower speed connection, while high definition video streaming or online gaming might not provide acceptable performance using a lower speed connection. When the network traffic arrives at the network stack in at least some embodiments there can be a callback from the respective application, which can be used to determine the respective application and the type of connection to be requested.

A user in some embodiments can specify different speeds to be used for different applications or data types, regardless of the current amount of bandwidth usage. For example, a user might select to user a lower speed connection for applications such as email, Web browsing, text messaging, and data backup, where a fast connection may not be required for a particular user, and the user in at least some cases might get a discount or lower cost plan for using a slower connection speed. The user might also set particular applications, such as streaming media and online gaming, to higher speed connections to ensure adequate performance. Other users might set slower speed connections for media and gaining applications, in order to reduce the amount of data that can be transmitted for what might be considered to be lower-priority tasks. In some embodiments, a user might be willing to pay a surcharge for the higher speed connection, and may be prompted or set limits using approaches similar to those discussed elsewhere herein. In some embodiments, the carrier might also provide certain limits or speed adjustments as part of the data plan, such as where the speed for any or all traffic decreases after the user reaches a certain amount of data usage, etc.

While having a monitoring module on a computing device can provide for adequate bandwidth management for situations where a user has a single device associated with a specific data plan, there can be other situations where such an implementation might not be an optimal solution. For example, the user might have multiple devices associated with a particular data plan, such as a family plan or employer plan. While a central location might be able to routinely poll each device for information, such an approach itself can utilize a significant amount of bandwidth to remain current. Further, portable computing devices typically have limited resources (e.g., processing and storage capacity, as well as battery life), such that it can be preferable in at least some situations to place the monitoring functionality at a (logically) centralized location.

Figure 6:
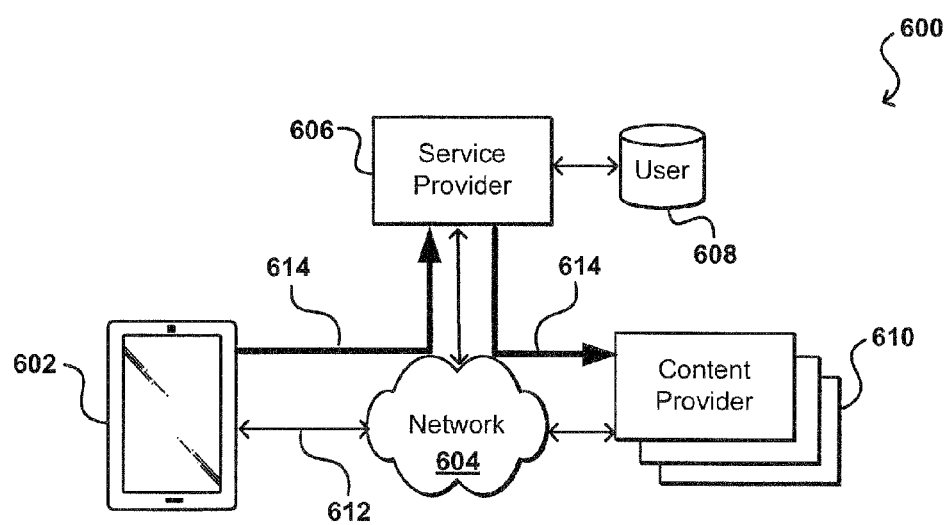
FIG. 6 illustrates a second example configuration that can be used to implement aspects in accordance with various embodiments.

FIG. 6 illustrates another example configuration 600 that can be used to provide for content filtering and/or bandwidth management in accordance with various embodiments. In this example, the management is performed at least in part by a service provider system 606 (or bandwidth monitoring service, etc.) that is configured to receive requests for content from a computing device 602 associated with a data plan offered by that service provider. One or more components of the service provider system can act like a proxy or firewall for the computing device, whereby any traffic passing through a data connection 612 for at least one network 604, the data connection being provided by that provider and part of a data plan, can pass through those provider components. Such an approach enables the monitoring logic to be provided by the service provider system 614, or "in the cloud," as opposed to being stored and executed on the user's computing device 602.

Instead of requests for content passing from the computing device 602 through the network 604 to the appropriate content providers 610 for various types of content, the request will follow a logical path 614 whereby the request is directed to the service provider system 606, which can determine whether to forward the request (or a related request) to the appropriate content provider 610. For example, a streaming audio application might request a socket in which to obtain streaming audio data from a particular audio provider. The service provider system 606 can determine whether to accept or deny the request based on various criteria discussed and suggested herein. If the request is denied, the service provider system can send a response to the computing device 602 indicating that the request was denied, and providing information relating to the denial. If the request requires approval, such as where the user is over or approaching a data limit, the service provider can send a request to the client device for the user to approve or reject the transmission.

When the user is under the limit or the request has been otherwise approved, the request (or a similar request) can be sent from the service provider system 606 to the appropriate content provider 610, or other such recipient. The service provider can configure the request such that the content that is returned will pass back through the service provider system 606, along a path similar to the path 614 of the request. Such an approach enables the service provider system 606 to monitor the amount of data being transmitted and potentially halt the transmission before it goes on to the computing device 602, which can help to prevent an overage. In some embodiments, the content providers can provide data to the service provider system using a very fast connection, and the service provider can forward the data to the client using a slower connection appropriate for the computing device under the subscription. In other embodiments, the service provider system 606 can configure the request such that the content returned in response goes "directly" to the computing device 602 without passing through the service provider system 606. Such an approach can potentially provide the service provider with less control over the transmission, but can reduce the amount of traffic that must be handled by the service provider system, and can reduce delays experienced by the user of the computing device. In some embodiments, the service provider system might indicate to the content provider that the content can be sent directly to the computing device, but might provide some restrictions or guidelines, such as a connection speed or maximum amount of data that can be transmitted, etc.

In at least some embodiments, the service provider can have the ability to adjust the content or data before being transmitted to the computing device. For example, the content provider might be able to perform various types of compression on documents, images, audio, video, or other such content that might be undetectable to the user. The ability to compress the data, however, enables the user to receive "more" content under the data plan, at least from the perception of the user. For example, a user might be able to stream fifteen movies in standard format but can stream seventeen movies after compression, even though the amount of data transmitted might be relatively similar. In some embodiments, the service provider might also be a content provider, where the service provider hosts content that the service provider can process to minimize the amount of data that must be transmitted. In some embodiments the service provider might not be a cellular provider, for example, but might be an entity having a relationship with a cellular provider or other network provider, and can manage data usage on a plan offered by the cellular provider or service provider, etc. Various processing of the data also can be performed "in the cloud" by the service provider system, such as to render images or perform other processing or manipulation, in order to further reduce the amount of data that must be transmitted and/or reduce the perceived response time for the user by taking advantage of faster and/or additional processing capacity of the provider system. In at least some embodiments, software can be installed on the computing device to also perform compression where possible and/or practical.

In some embodiments where the service provider hosts or provides one or more types of content, the provider can potentially offer discounted transmission rates or additional bandwidth allocations when the user purchases, rents, downloads, or otherwise obtains content from the provider. In some embodiments, content purchased from the provider might not count against the user's data plan limits. For example, if the provider offers streaming movies for a fee, the user can obtain a movie for the determined fee without also having to have the bandwidth for obtaining the movie count against the user's bandwidth allocation. If the provider offers content such as an electronic marketplace where users can browse for, and purchase, various items, the provider might enable the user to access that marketplace using the connection without the access counting against the user's data plan, at least when the user makes a purchase in a current session, etc. In some embodiments, each purchase might earn the user additional bandwidth allocation. Similarly, users who have specific types of accounts with the provider might get additional bandwidth allocations or different pricing structures, etc. In some embodiments, a service provider might purchase a large block of bandwidth from a data network provider and divide that bandwidth up among customers of the service provider at rates and/or allocations determined by the service provider. In some embodiments, certain types of customers might get a monthly data allocation at no additional cost to those customers, at a significant discount, etc. In some embodiments, the user might not be charged for the data plan but might only have access to content provided by the service provider, where the user can obtain movies, music, and other content from the service provider. Content from other providers might be accessible for an additional fee, such as where a customer also wants to be able to browse the Web, or perform other such actions. Various other options or incentives can be used as well within the scope of the various embodiments.

Figure 7:
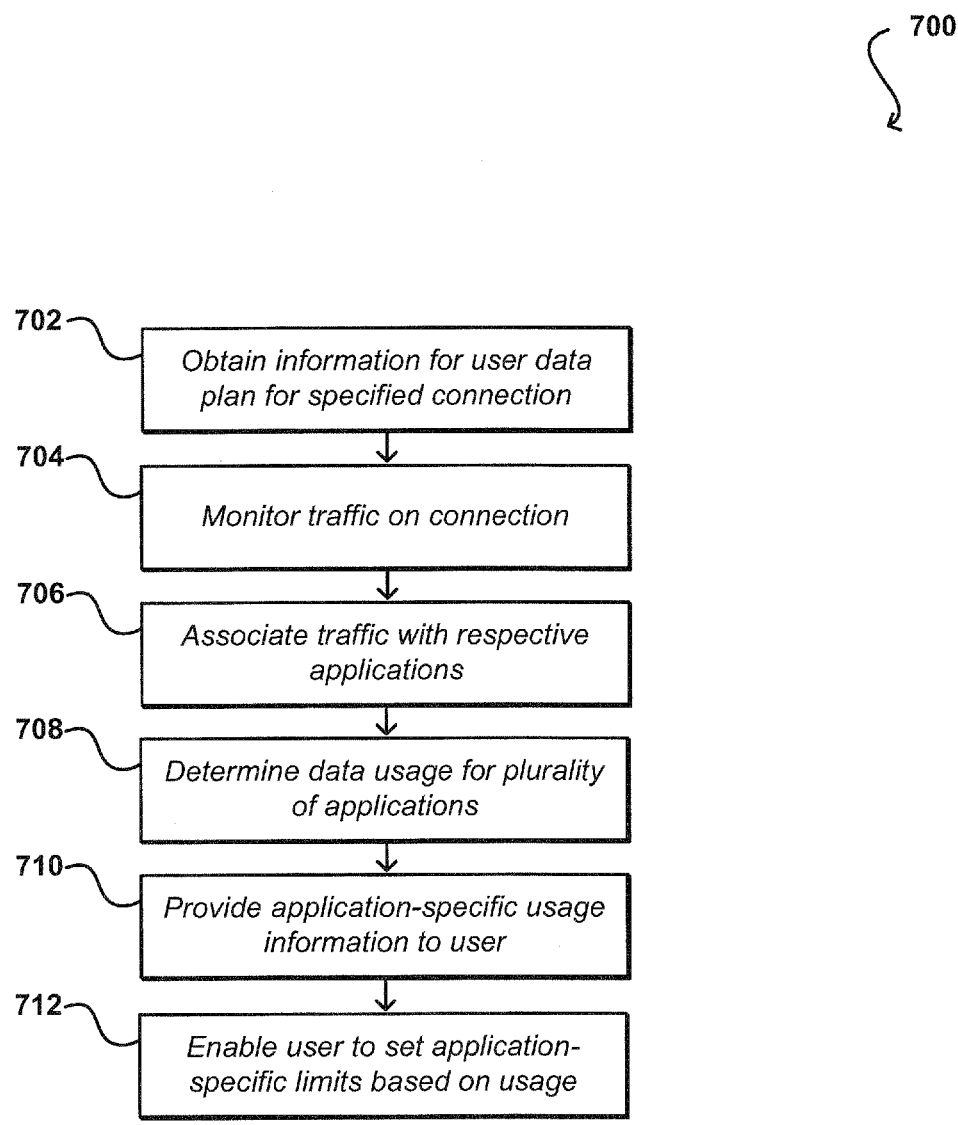
FIG. 7 illustrates an example process for monitoring data transmission that can be used in accordance with various embodiments.

FIG. 7 illustrates an example process 700 for monitoring bandwidth usage for a data connection that can be utilized in accordance with various embodiments. It should be understood for this and other processes disclosed herein that there can be additional, fewer, or alternative steps performed in similar or alternative orders, or in parallel, within the scope of the various embodiments unless otherwise stated. In this example, a system, service, or component (such as a monitoring component) obtains 702 information for a user data plan for a specified connection. This can include at least determining that a certain connection (e.g., a cellular data connection) has a type of limit attached for which usage can advantageously be monitored, and can also include information such as the amount of bandwidth included in a billing cycle, the timing of the billing cycle, the availability and cost of overages, and other such information. The traffic on that connection then can be monitored 704, and at least a portion of the traffic can be associated 706 with a respective application, or other source of the request or transmission, etc. The data usage and/or other such information can be determined 708 for at least a selection of applications, such as may include common applications, frequently accessed applications, or applications for which monitoring was selected. The application-specific usage information for the current billing cycle, previous billing cycles, lifetime amounts or averages, and/or other such information then can be provided 710 to the user. As discussed, such information can help the user determine how much each type of usage contributes to the overall amount of usage, and make adjustments in the user's behavior as appropriate. In at least some embodiments, a monitoring module, service provider interface, network console, or other such component can enable 712 the user to set application-specific limits, or other such thresholds or criteria, based at least in part upon the provided usage information. As discussed, the user can set one or more usage limits, and specify how the transmissions are to be handled when the user is at, near, and/or over a specified threshold.

Figure 8:
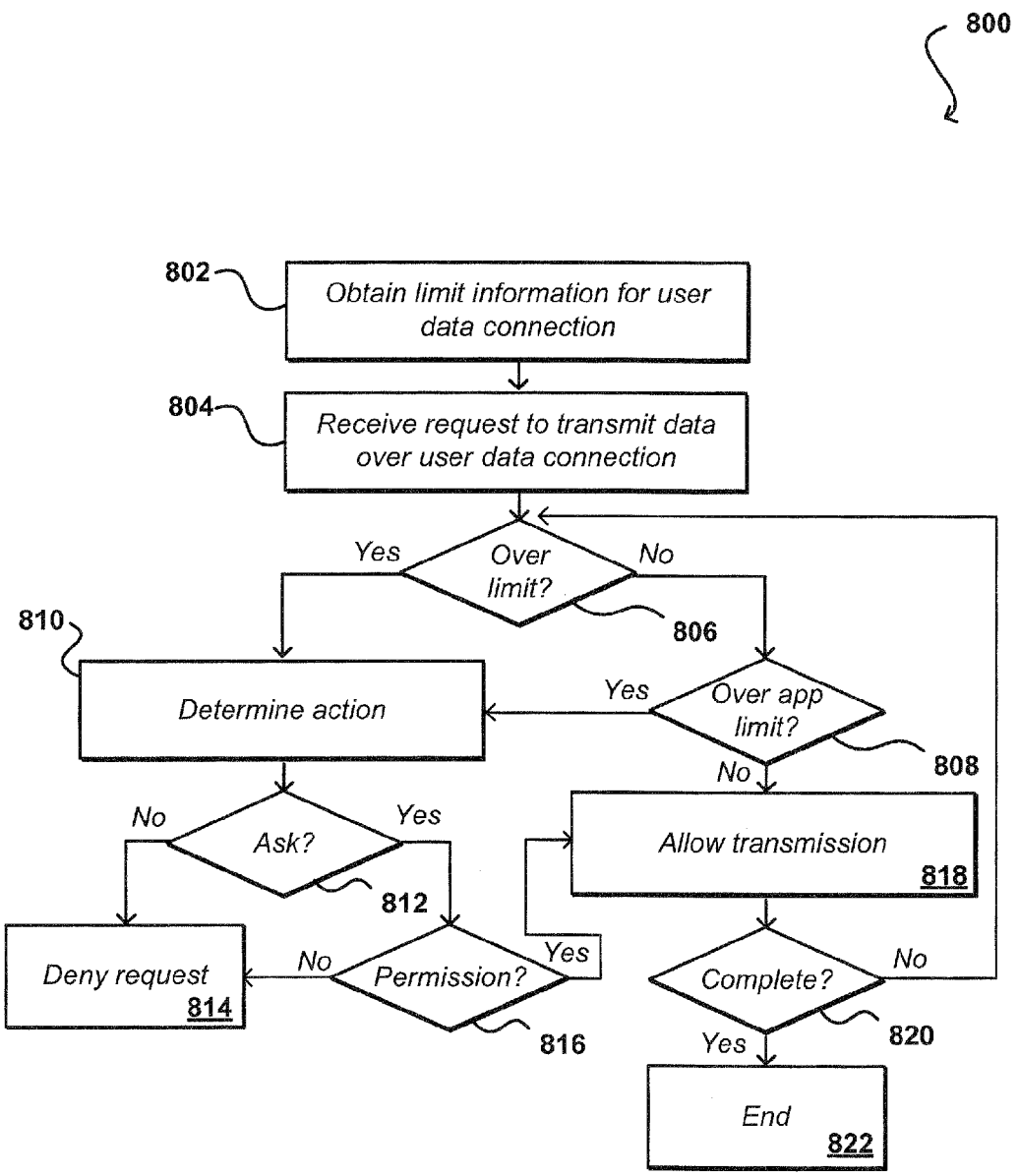
FIG. 8 illustrates an example process for managing data transmission that can be used in accordance with various embodiments.

FIG. 8 illustrates an example process 800 for managing data transmissions or bandwidth usage that can be utilized in accordance with various embodiments. In this example, limit information is obtained 802 for a user data connection. As discussed above, this can include data plan limits as well as limits specified by a user for one or more applications or types of data transmission, among other such limits or criteria. A system, service, or module configured to manage data transmissions for a connection can receive 804 a request to transmit data over the data connection. This can include, for example, a request from an application to open a socket to transmit data for that application. The received request can be analyzed to determine the type of request, the corresponding application or source, or other such information to determine 806 whether the request may cause the user to exceed a data limit for the connection, if the connection is not already exceeded. If not, a similar determination 808 can be made as to whether this request will cause the user to exceed a specified limit for a type of application, data, or source, for example, if not already exceeded. If the request is determined to be at, or over, the limit in either case, an appropriate action can be determined 810, such as to deny the request or prompt the user whether to allow the transmission. If the determined action is not to ask but to deny such action, the request can be denied 814. If the determined action involves asking 812 the user, the user can be asked and if permission is not received the request can be denied. If permission is received 816, or if the request is determined not to cause the user to be at risk for exceeding a specified limit, the transmission can be allowed 818. If permission is granted to exceed the limit, the limit might be adjusted or ignored for that transmission such that a subsequent determination of overage will not result in a similar prompt or other such action. Various other actions for approaching or exceeding limits can be used as well as discussed and suggested elsewhere herein. If the transmission completes 820, the process with respect to at least the current request can end 822. If the transmission has not yet completed, in at least some embodiments the management process can continue and subsequent determinations made as to whether the transmission is approaching, at, or over a specified limit. Such an approach can be advantageous for a transmission such as an audio stream, which might not be predicted to cause an overage initially but after an extended period of listening can become likely to exceed a specified limit. If the transmission approaches such a limit, similar actions can be determined 810 and taken as discussed elsewhere herein.

As part of the monitoring and management process, certain embodiments enable a management system to suggest or automatically adjust limits based on user preferences or user behavior, among other such factors. For example, if the user has a limit to only allow 20% of the data allocation for email but the user consistently uses 50% of the allocation for email, which results in overage charges, the system could potentially adjust the limit to guarantee 50% of the allocation for email, such that the user can have limits that reflect actual usage and then determine whether to exceed the limit for other activities that are not used as consistently, etc. in some embodiments, the system can analyze past behavior, such as by analyzing a user's email account for past traffic information, to predict an initial amount that should be allocated to a particular application. The system can then adjust these limits automatically as more information is gathered in order to make more accurate predictions. The values also can be weighted and/or decayed such that more recent activity will be reflected more heavily in the predictions. For example, a user who recently subscribed to a music service and is streaming more audio data can have an audio data limit increased accordingly. In such an embodiment, the user might be able to specify a percentage of usage as a limit on a specific application. For example, instead of using fixed limits the user might want the system to track the average usage of a particular application and notify the user when the user is at a particular percentage of the average usage, such as 80%, 90%, 100%, 110%, or another such value. In some embodiments, a user can set temporary limits for when the user goes on vacation, is working out of town, or is otherwise engaging in an activity that may have significantly different data usage, but the user does not want to have to adjust the typical settings, and then adjust them back after the activity.

In some embodiments, a user also can add certain applications to a "white list" or otherwise designate that these applications should never be blocked even if the usage will result in an overage. For example, if the user uses a smart phone to receive work email then the user may not want that application or type of data to ever be blocked. Similarly, a provider can place applications on a white list where the provider provides those applications or otherwise is willing to provide that data free of charge to the user. In some embodiments, a user can specify that an application is to always get at least a guaranteed amount of bandwidth regardless of other usage. For example, a user might want to make sure to have a minimum amount of bandwidth for a certain application, but might not want to grant unlimited access to that application. Various other settings can be specified as well as discussed and suggested elsewhere herein.

A user also can specify the types of notifications that will be received. In some embodiments, the user can select a default type of notification for the device, such as a notification for a smart phone that a voice mail message has been received or a notification for a tablet computer that an update is available for a downloaded application. In other embodiments, the user can specify the type of notification, such as a ring tone or specific message when the user is to go over the data limit, etc.

As discussed, a user also can have the option to allow a compression of data, a decrease in transmission speed, or a reduction in the quality or resolution of the content to be received when the user is at, near, or over a limit. Providers can specify similar options. In at least some embodiments, however, the provider might not want to degrade the customer experience, particular to shift to a lower resolution video stream in the middle of a movie, and as such might not allow for such degradation in service, except where compression or transmission speed will not affect the user experience, etc.

As discussed above with respect to FIG. 6, the ability to determine whether to allow a transmission of data for a specific application across a specified network connection enables a monitoring component, or similar system or service, to effectively function as a reverse firewall for a computing device. While discussed above with respect to conventional data plans and data limits, it should be understood that other aspects of a network connection can be utilized as well, such as roaming charges (imposed when accessing a network outside the scope of coverage of the provider), International data transmission charges, additional data transmission charges (when connected to a premium or pay-as-you-go network), or other such information. For example, a user might be willing to pay overage charges on a domestic data plan, but might not be willing to pay International roaming charges, which can be significantly more expensive. In other cases, a user might want to limit the amount of data transmission while in a state such as roaming or using a connection with additional charges, might only allow certain applications or types of transmissions to be allowed while roaming, etc.

Approaches in accordance with various embodiments can enable users to specify various limits and actions to be applied to specific networks, or types of connection or coverage, among various other network aspects. For example, a user might allow a streaming audio application to exceed a specified limit for a domestic network, but might block that application when roaming or on a premium connection, as streaming applications can utilize a significant amount of bandwidth, which can result in substantial roaming charges and/or additional fees. Further, certain applications might periodically transmit data searching for updates, new messages, additional content, or other such information. A user might also decide to block these relatively small (but potentially frequent) transmissions, which over time can accumulate to significant overage and/or roaming charges.

In some embodiments, a user might be able to cap the amount of bandwidth or number of these "hidden" requests that an application can make over a given period of time. For example, an email application might be configured to check for new messages every 30 seconds, or some other such period. In order to reduce roaming charges, a user might configure a monitoring component such that an email application is only allowed one outgoing transmission every five to ten minutes, or some other much less frequent option. In some embodiments, the monitoring module can automatically allow outgoing messages to be transmitted when indicated by the user, or can hold those outgoing messages until the next allowed transmission. Various other configuration options can be utilized as well within the scope of the various embodiments.

As will be appreciated, although a Web-based environment is often used herein for purposes of explanation, different environments may be used, as appropriate, to implement various embodiments. For example, a user can utilize a client device that can include any appropriate device operable to send and receive requests, messages, or information over an appropriate network and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In one example, the network includes the Internet, as the environment includes a Web server for receiving requests and serving content in response thereto, although for other networks an alternative device serving a similar purpose could be used as would be apparent to one of ordinary skill in the art. The illustrative environment also includes at least one application server and data store. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing data usage, comprising:
   under control of one or more computer systems configured with executable instructions,
   receiving, at a service provider from a first client device, a first user input associated with a first application executing on the first client device, the first user input specifying a first adjustment action for reducing a first amount of transmitted data;
   receiving, at the service provider from a second client device, a second user input associated with a second application executing on the second client device, the second user input specifying a second adjustment action for reducing a second amount of transmitted data;
   receiving, at the service provider from the first client device, a request associated with a first data transmission over a network connection, the network connection having a combined user data limit that applies to the first client device and the second client device, the first data transmission used by the first application;
   receiving, at the service provider from a source of the first data transmission, an estimated data transmission amount corresponding to the first data transmission;
   determining, at the service provider, a first application-specific data limit specified by a user for the first application;
   determining, at the service provider, the estimated data transmission amount exceeds at least one of the first application-specific data limit or the combined user data limit;
   identifying, at the service provider, the first adjustment action associated with the first application; and
   sending information from the service provider to the source of the first data transmission, the information causing a change in format of at least a portion of the first data transmission from a high-definition data format to a standard-definition data format to reduce the first amount of transmitted data below the first application-specific data limit and the combined user data limit.

2. The computer-implemented method of claim 1, wherein each of a plurality of applications on the first client device has an associated data limit and an associated action, the associated data limit and the associated action being adjustable by a user or a provider of the network connection.

3. The computer-implemented method of claim 1, further comprising:
   monitoring data usage of the first data transmission;
   determining the data usage will exceed at least one of the first application-specific data limit or the combined user data limit within a period of time; and
   performing the first adjustment action.

4. The computer-implemented method of claim 1, further comprising:
   determining the network connection is in a roaming state or subject to additional transmission charges; and
   performing the first adjustment action.

5. The computer-implemented method of claim 1, wherein the first adjustment action further comprises a block action configured to prevent the first data transmission, or an allowance action configured to allow the first data transmission.

6. A computing device, comprising:
   a processor; and
   memory including instructions that, when executed by the processor, cause the computing device to:
   receive, at a service provider from a client device, a user input associated with an application executing on the client device, the user input specifying an adjustment action for reducing an amount of transmitted data;
   receive, at the service provider from the client device, a request associated with a data transmission over a network connection having a user data limit, the data transmission used by the application;
   receive, at the service provider from a source of the data transmission, an estimated data transmission amount corresponding to the data transmission;
   determine, at the service provider, the estimated data transmission amount exceeds one of an application-specific data limit associated with the application or the user data limit;
   identify, at the service provider, the adjustment action associated with the application; and send information from the service provider to the source of the data transmission, the information causing a change in format of at least a portion of the data transmission from a high-definition data format to a standard-definition data format to reduce the amount of transmitted data below the application-specific data limit and the user data limit.

7. The computing device of claim 6, wherein the instructions when executed further cause the computing device to:
provide, to a user, an estimated amount of time the data transmission can occur before the amount of transmitted data will exceed at least one of the application-specific data limit or the user data limit.

8. The computing device of claim 6, wherein the instructions when executed further cause the computing device to:
enable a user to shift at least a portion of an unused data limit from another application associated with the computing device.

9. The computing device of claim 6, wherein each of a plurality of applications on the computing-device has an associated data limit and an associated action, the associated data limit and the associated action being adjustable by a user or a provider of the network connection.

10. The computing device of claim 6, wherein the instructions when executed further cause the computing device to:
prompt a user whether to allow the data transmission.

11. The computing device of claim 6, wherein the instructions when executed further cause the computing device to:
monitor data usage of the client device;
determine the data usage will exceed at least one of the application-specific data limit or the user data limit; and
perform a second adjustment action.

12. A system for refining a search query, comprising:
a processor; and
a memory device including instructions that, when executed by the processor, cause the system to:
receive, at a service provider from a client device, a user input associated with an application executing on the client device, the user input specifying an adjustment action for reducing an amount of transmitted data;
receive, at the service provider from the client device, a request associated with a data transmission over a network connection having a user data limit, the data transmission used by the application;
receive, at the service provider from a source of the data transmission, an estimated data transmission amount corresponding to the data transmission;
determine, at the service provider, an application-specific data limit specified by a user for the application;
determine, at the service provider, the estimated data transmission amount exceeds one of the application-specific data limit or the user data limit;
identify, at the service provider, the adjustment action associated with the application; and
send information from the service provider to the source of the data transmission, the information causing a change in format of at least a portion of the data transmission from a high-definition data format to a standard-definition data format to reduce the amount of transmitted data below the application-specific data limit and the user data limit.

13. The system of claim 12, wherein each of a plurality of applications on the client device has an associated data limit and an associated action, the associated data limit and the associated action being adjustable by a user or a provider of the network connection.

14. The system of claim 12, wherein the instructions when executed further cause the system to:
determine the amount of transmitted data exceeds at least one of the application-specific data limit or the user data limit; and
prompt the user whether to allow the data transmission.

15. The system of claim 12, wherein the instructions when executed further cause the system to:
monitor data usage of the client device;
determine the data usage will exceed at least one of the application-specific data limit or the user data limit; and
perform a second adjustment action.

* * * * *